(12) United States Patent
Lee

(10) Patent No.: US 10,162,384 B2
(45) Date of Patent: Dec. 25, 2018

(54) DISPLAY DEVICE

(71) Applicant: Samsung Display Co., Ltd., Yongin-si, Gyeonggi-do (KR)

(72) Inventor: Dukjin Lee, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 3 days.

(21) Appl. No.: 15/077,645

(22) Filed: Mar. 22, 2016

(65) Prior Publication Data

US 2016/0349788 A1 Dec. 1, 2016

(30) Foreign Application Priority Data

May 27, 2015 (KR) .................. 10-2015-0073803

(51) Int. Cl.
*G06F 1/16* (2006.01)

(52) U.S. Cl.
CPC ............ *G06F 1/1637* (2013.01); *G06F 1/163* (2013.01); *G09G 2300/04* (2013.01)

(58) Field of Classification Search
CPC .......... G06F 1/16; G06F 1/163; G06F 1/1637; G09G 3/30; G09G 3/32; G09G 3/3208; G09G 3/34; G09G 3/36; G09G 2300/04
USPC .......................................................... 345/55
See application file for complete search history.

(56) References Cited

U.S. PATENT DOCUMENTS

| | | | | |
|---|---|---|---|---|
| 2008/0013409 A1* | 1/2008 | Bland | ................ | G04B 45/0038 368/223 |
| 2009/0102758 A1* | 4/2009 | Anzai | .................. | G09G 3/3225 345/76 |
| 2011/0051562 A1* | 3/2011 | Blondeau | ............... | G04B 19/02 368/80 |
| 2011/0107894 A1 | 5/2011 | Maekawa et al. | | |
| 2011/0255303 A1* | 10/2011 | Nichol | .................. | G02B 6/006 362/606 |
| 2012/0050958 A1* | 3/2012 | Sanford | ............... | G06F 1/1626 361/679.01 |
| 2013/0271710 A1 | 10/2013 | Tatemura et al. | | |
| 2014/0253394 A1* | 9/2014 | Nissinen | .................. | H01Q 7/00 343/702 |
| 2014/0253419 A1* | 9/2014 | Tanada | ................. | G09G 3/2092 345/55 |
| 2015/0205132 A1* | 7/2015 | Osterhout | .......... | G02B 27/0172 345/633 |
| 2015/0205184 A1* | 7/2015 | Ellis-Brown | ......... | G06F 1/1628 455/575.8 |
| 2015/0211707 A1* | 7/2015 | Watanabe | ......... | G02F 1/133308 345/667 |

FOREIGN PATENT DOCUMENTS

| | | |
|---|---|---|
| JP | 2013-221959 A | 10/2013 |
| KR | 10-2011-0016927 A | 2/2011 |
| KR | 10-2012-0004119 A | 1/2012 |
| KR | 10-2012-0006175 A | 1/2012 |

* cited by examiner

*Primary Examiner* — Stephen G Sherman

(74) *Attorney, Agent, or Firm* — Lewis Roca Rothgerber Christie LLP

(57) ABSTRACT

A display device includes: a display panel including a display area having a circular shape; and a cover window on the display panel, wherein the cover window includes: a center portion covering a center area of the display area; and an edge portion covering an edge area of the display area, and the edge portion is chamfered.

14 Claims, 4 Drawing Sheets

DISPLAY DEVICE

CROSS-REFERENCE TO RELATED APPLICATION

This application claims priority to and the benefit of Korean Patent Application No. 10-2015-0073803, filed on May 27, 2015, with the Korean Intellectual Property Office, the disclosure of which is incorporated herein in its entirety by reference.

BACKGROUND

1. Field

Aspects of embodiments of the present invention relate to a display device.

2. Description of the Related Art

In recent times, wearable devices, such as smart watches or head mount display devices, have found a wide range of applications, and demand for display devices with a display area having a circular shape has increased.

A display device may include a display area including a plurality of pixels and a non-display area around the display area. The display area may have a pixel arrangement in which the number of pixels arranged in each row and each column decreases from a center area of the display area toward an edge area thereof to thereby achieve the display area having a circular shape.

For example, in a case where the display area has a pixel arrangement of an m×n matrix configuration, from a pixel row $PR_{m/2}$ in the center area of the display area toward a pixel row $PR_1$ or a pixel row $PR_m$ at the edge area thereof, the number of pixels forming each pixel row PR may decrease. Likewise, from a pixel column $PC_{n/2}$ in the center area of the display area toward a pixel column $PC_1$ or a pixel column $PC_n$ at the edge area thereof, the number of pixels forming each pixel column PC may decrease.

However, despite having the pixel arrangement described in the foregoing, the display area may not obtain a perfect circular shape. For example, when the edge area of the display area is enlarged, a step structure, in which the plurality of pixels are arranged in a step structure may be observed or perceived by users.

It is to be understood that this Background section is intended to provide useful background for understanding the technology. As such, this Background section may include ideas, concepts, or recognitions that do not constitute prior art.

SUMMARY

Aspects of embodiments of the present invention relate to a display device including a display area having a circular shape.

Some embodiments of the present invention are directed to a display device with enhanced display quality, in which the visibility of a step structure at an edge area of a display area having a circular shape may be prevented or reduced.

According to an embodiment of the present invention, a display device includes: a display panel including a display area having a circular shape; and a cover window on the display panel, wherein the cover window includes: a center portion covering a center area of the display area; and an edge portion covering an edge area of the display area, and the edge portion is chamfered.

The display area may include: a plurality of pixel rows arranged in a first direction; and a plurality of pixel columns arranged in a second direction intersecting the first direction, wherein the pixel rows and the pixel columns respectively comprise a plurality of pixels, and the number of pixels decreases from a pixel row in the center area of the display area toward a pixel row at the edge area of the display area and the number of pixels decreases from a pixel column in the center area of the display area toward a pixel column at the edge area of the display area.

The cover window may include at least one of glass, sapphire, diamond, polymethylmethacrylate ("PMMA"), or polycarbonate ("PC").

A chamfered angle $\theta\_glass$ of the edge portion may be 41.1 degrees or more, when the cover window comprises glass.

A width $X\_glass$ of the edge portion may satisfy the following Formula: $X\_glass = Y\_glass/\tan(\theta\_glass)$, wherein $X\_glass$ refers to the width of the edge portion, $Y\_glass$ refers to a thickness of the cover window, and $\theta\_glass$ refers to the chamfered angle of the edge portion.

A chamfered angle $\theta\_sapphire$ of the edge portion may be 34.4 degrees or more, when the cover window comprises sapphire.

A width $X\_sapphire$ of the edge portion may satisfy the following Formula: $X\_sapphire = Y\_sapphire/\tan(\theta\_sapphire)$, wherein $X\_sapphire$ refers to the width of the edge portion, $Y\_sapphire$ refers to the thickness of the cover window, and $\theta\_sapphire$ refers to the chamfered angle of the edge portion.

A chamfered angle $\theta\_diamond$ of the edge portion may be 24.4 degrees or more, when the cover window comprises diamond.

A width $X\_diamond$ of the edge portion may satisfy the following Formula: $X\_diamond = Y\_diamond/\tan(\theta\_diamond)$, wherein $X\_diamond$ refers to the width of the edge portion, $Y\_diamond$ refers to the thickness of the cover window, and $\theta\_diamond$ refers to the chamfered angle of the edge portion.

A chamfered angle $\theta\_PMMA$ of the edge portion may be 40.2 degrees or more, when the cover window comprises PMMA.

A width $X\_PMMA$ of the edge portion may satisfy the following Formula: $X\_PMMA = Y\_PMMA/\tan(\theta\_PMMA)$, wherein $X\_PMMA$ refers to the width of the edge portion, $Y\_PMMA$ refers to the thickness of the cover window, and $\theta\_PMMA$ refers to the chamfered angle of the edge portion.

A chamfered angle $\theta\_PC$ of the edge portion may be 40.2 degrees or more, when the cover window comprises PC.

A width $X\_PC$ of the edge portion may satisfy the following Formula: $X\_PC = Y\_PC/\tan(\theta\_PC)$, wherein $X\_PC$ refers to the width of the edge portion, $Y\_PC$ refers to the thickness of the cover window, and $\theta\_PC$ refers to the chamfered angle of the edge portion.

The foregoing is illustrative only and is not intended to be in any way limiting. In addition to the illustrative aspects, embodiments, and features described above, further aspects, embodiments, and features will become more apparent by reference to the drawings and the following detailed description.

BRIEF DESCRIPTION OF THE DRAWINGS

The above and other features and aspects of the present disclosure of the present invention will be more clearly understood from the following detailed description taken in conjunction with the accompanying drawings, in which.

DETAILED DESCRIPTION

Figure 1:
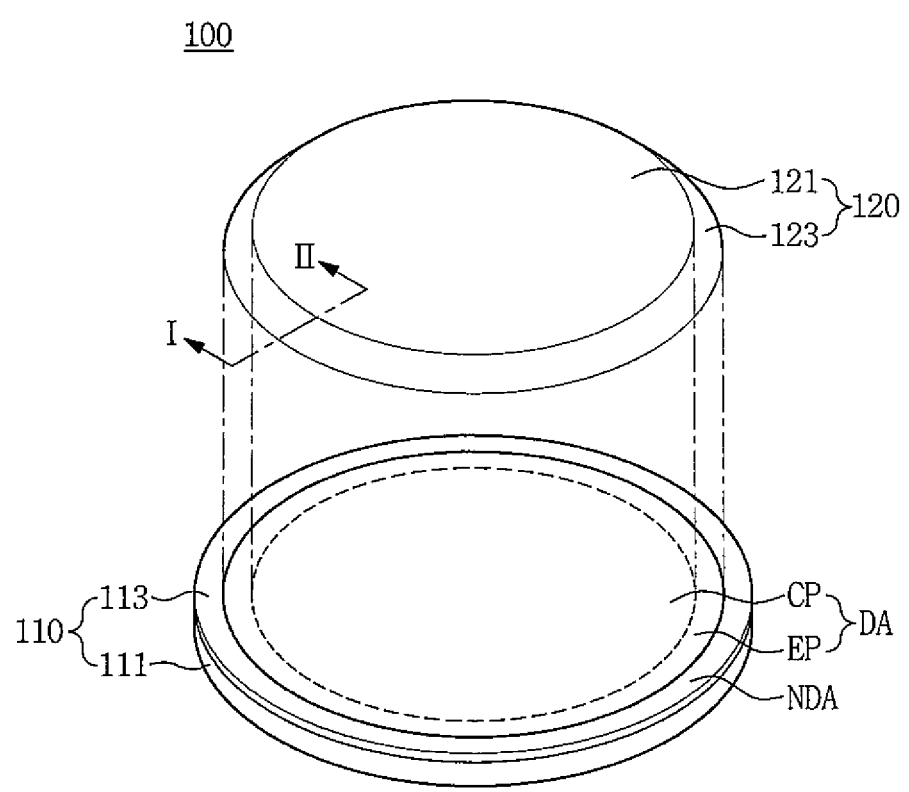
FIG. 1 is an exploded perspective view illustrating a display device according to an example embodiment of the present invention.

Hereinafter, example embodiments of the present invention will be described in more detail with reference to the accompanying drawings.

Although the present invention can be modified in various manners and have several embodiments, example embodiments are illustrated in the accompanying drawings and will be described in the specification. However, the scope of the embodiments of the present invention is not limited to the specific embodiments and should be construed as including all the changes, equivalents, and substitutions included in the spirit and scope of the present invention.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" can be termed likewise without departing from the teachings herein.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Some of the parts which are not associated with the description may not be provided in order to specifically describe embodiments of the present invention, and like reference numerals refer to like elements throughout the specification.

Hereinafter, a display device according to an example embodiment will be described under the assumption that a liquid crystal display ("LCD") panel is used. However, the display device according to the present invention may be applied to an organic light emitting diode ("OLED") display panel or a plasma display panel ("PDP"), in addition to the LCD panel.

FIG. 1 is an exploded perspective view illustrating a display device 100 according to some example embodiments of the present invention.

In reference to FIG. 1, the display device 100 according to some example embodiments of the present invention includes a display panel 110 and a cover window 120 on the display panel 110.

The display panel 110 includes a first substrate 110, a second substrate 113 opposing the first substrate 111, and a liquid crystal layer interposed between the first substrate 111 and the second substrate 113.

A plurality of pixels are arranged on the first substrate 111. An arrangement configuration of the pixels on the first substrate 111 will be described further below. The pixels each include a pixel electrode, a thin film transistor applying a driving voltage to the pixel electrode, a signal line for driving the pixel electrode and the thin film transistor, and the like.

The second substrate 113 is arranged oppose to the first substrate 111 and includes a common electrode including a transparent conductive material and a color filter. The color filter includes a red color filter, a green color filter, and a blue color filter.

The liquid crystal layer is arranged between the first substrate 111 and the second substrate 113, and is rearranged by an electric field formed between the pixel electrode and the common electrode. Accordingly, the rearranged liquid crystal layer adjusts transmittance of light emitted from a backlight unit, and the adjusted light may be transmitted through the color filter, such that an image may be displayed externally.

In addition, a lower polarizer may be arranged on a lower surface of the first substrate 111, and an upper polarizer may be arranged on an upper surface of the second substrate 113. The upper polarizer and the lower polarizer may have a planar area corresponding to the display panel 110.

The upper polarizer may transmit light of a predetermined polarization among light being externally incident and may absorb or block other light. The lower polarizer may transmit light of a predetermined polarization among light emitted from the backlight unit and may absorb or block other light.

The display panel 110 includes a display area DA on which an image is displayed and a non-display area NDA around the display area DA. When viewed from a plan view, the display area DA may be generally or substantially circular in shape, and the non-display area NDA may have various shapes such as a circular shape, a triangular shape, a quadrangular shape, or a polygonal shape. Based on the shape of the non-display area NDA, an overall shape of the display panel 110 may be determined. Hereinafter, example embodiments of the present invention will be described under the assumption that the non-display area NDA has a circular shape as illustrated in FIG. 1. Embodiments of the present invention, however, are not limited thereto.

In addition, the display area DA may be divided into a center area CP and an edge area EP. The center area CP is an area in which a step structure is invisible, and the edge area EP is an area in which the step structure is visible. The description with respect thereto will be described further below.

The cover window 120 is arranged on the display panel 110. For example, the cover window 120 may be arranged to cover the display area DA of the display panel 110. The cover window 120 includes a center portion 121 covering the center area CP of the display area DA and an edge portion 123 covering the edge area EP of the display area DA. The edge portion 123 of the cover window 120 is chamfered.

The cover window 120 may include one of glass, sapphire, diamond, polymethylmethacrylate (PMMA), and polycarbonate (PC).

Although not illustrated in FIG. 1, a touch screen panel may be further arranged between the display panel 110 and the cover window 120. The touch screen panel may detect presence and position of a touch input. For example, a user may utilize the touch screen panel using a stylus pen (or a finger of the user). The touch screen panel may be formed of a transparent material.

Figure 2:
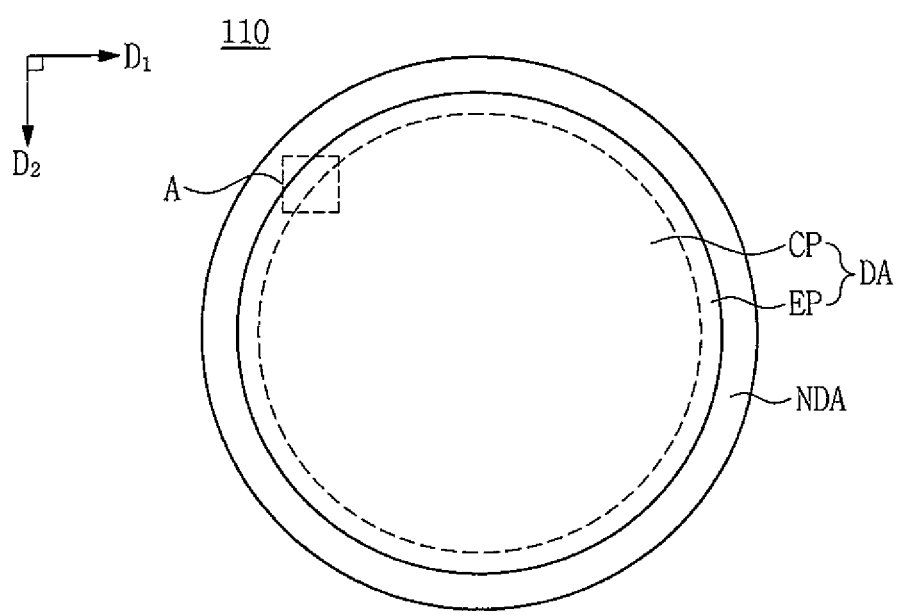
FIG. 2 is a plan view illustrating a display panel according to an example embodiment of the present invention.
Figure 3:
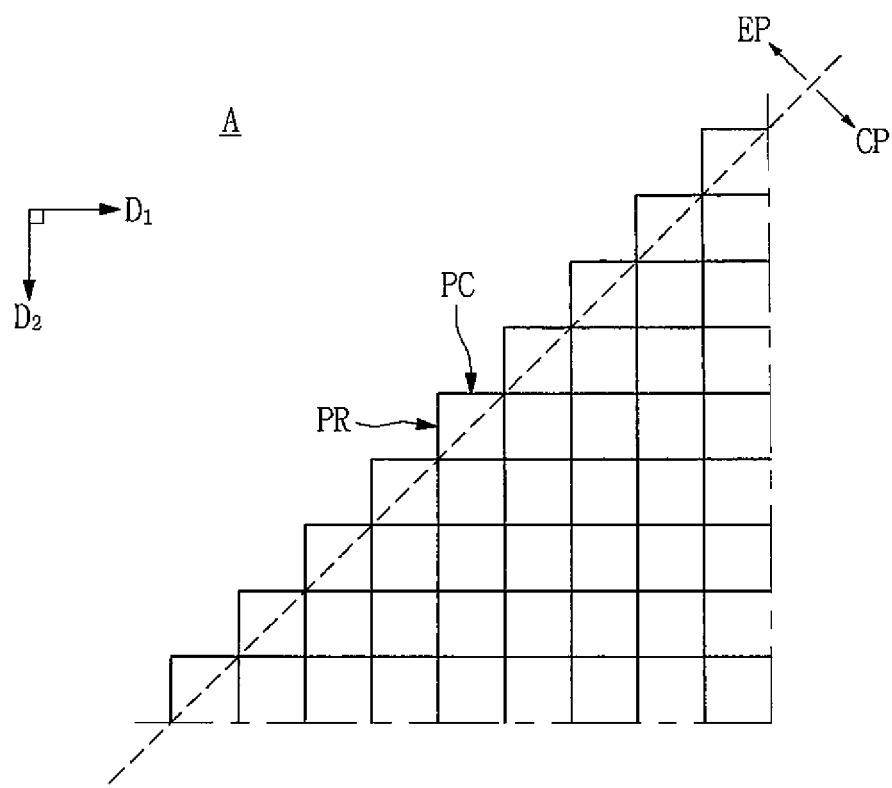
FIG. 3 is an enlarged view illustrating the portion "A" of FIG. 2.

FIG. 2 is a plan view illustrating the display panel 110 according to the example embodiment and FIG. 3 is an enlarged view illustrating the portion "A" of FIG. 2.

In reference to FIGS. 2 and 3, the display panel 110 according to the example embodiment includes the display area DA having a circular shape and the non-display area NDA around the display area DA.

In addition, the display area DA includes the center area CP in which the step structure is invisible and the edge area EP in which the step structure is visible.

The display area DA includes a plurality of pixel rows PR arranged in a first direction D1 and a plurality of pixel columns PC arranged in a second direction D2 which intersects the first direction D1. A plurality of pixels arranged in a single row are collectively referred to as the pixel row PR, and a plurality of pixel arranged in a single column are collectively referred to as the pixel column PC.

That is, when the plurality of pixels are arranged in an m×n matrix form, 'm' number of the pixel rows PR1, PR2, PR3, . . . PRm−2, PRm−1, PRm are arranged in the first direction D1 and 'n' number of the pixel columns PC1, PC2, PC3, . . . PCn−2, PCn−1, PCn are arranged in the second direction D2.

In addition, in order to impart a circular shape to the display area DA, the number of pixels forming each pixel row PR decreases from the pixel row $PR_{m/2}$ in the center area CP of the display area DA toward pixel rows $PR_1$ and $PR_m$ at the edge area EP thereof. Likewise, the number of pixels forming each pixel column PC decreases from the pixel column $PC_{n/2}$ in the center area CP of the display area DA toward pixel columns $PC_1$ and $PC_n$ at the edge portion EP thereof.

However, despite having the pixel arrangement described in the foregoing, the display area DA may not obtain a perfect circular shape. As illustrated in FIG. 3, at the edge area EP of the display area DA, a step structure which consists of the plurality of pixels arranged in a step structure may be observed.

Thus, according to the present invention, a cover window 120 on the display panel 110 is optically designed, such that the visibility of the step structure at the edge area EP of the display area DA is prevented or reduced to thereby provide a display device with relatively improved display quality.

Figure 4:
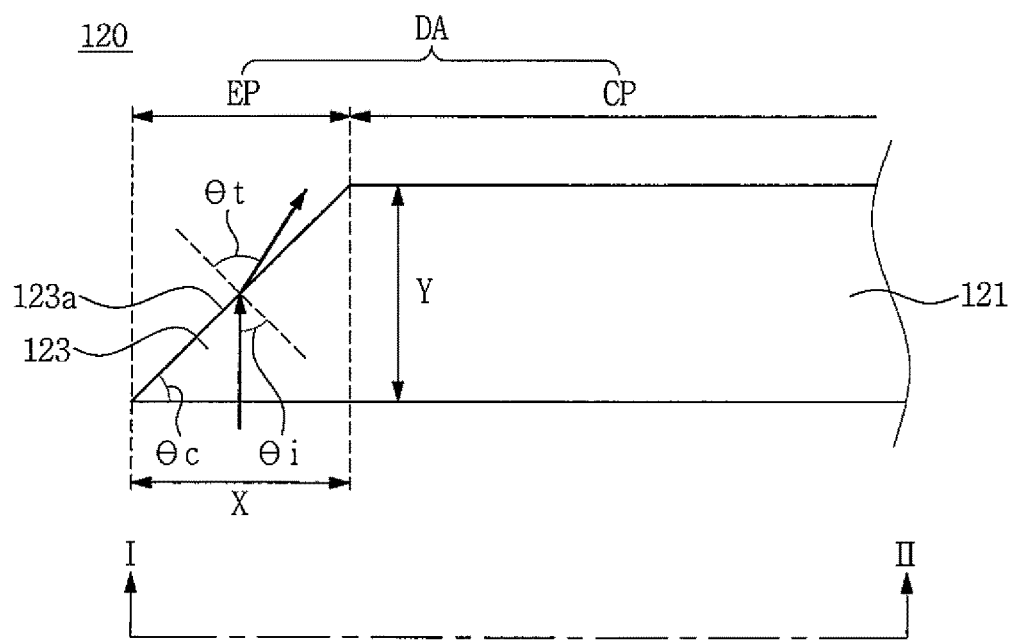
FIG. 4 is a cross-sectional view taken along the line I-II of FIG. 1.

FIG. 4 is a cross-sectional view taken along the line I-II of FIG. 1.

In reference to FIG. 4, the cover window 120 includes a center portion 121 covering the center area CP of the display area DA and an edge portion 123 covering the edge area EP of the display area DA. The edge portion 123 of the cover window 120 is chamfered at a chamfered angle (e.g., a predetermined chamfered angle) $\theta_c$.

The cover window 120 may totally reflect light emitted from a pixel arranged at the edge area EP of the display area DA using the edge portion 123 which is chamfered. Accordingly, the pixel arranged at the edge area EP of the display area DA may be invisible from the outside, such that the visibility of the step structure may be prevented or reduced.

That is, light incident to the edge portion 123 of the cover window 120 may be totally reflected using a chamfered surface 123a of the edge portion 123.

When an incident angle of light incident to the chamfered surface 123a is denoted as "incident angle $\theta_i$," and an emission angle of light emitted from the chamfered surface 123a is denoted as "emission angle $\theta_t$," the incident angle $\theta_i$ of the light incident to the chamfered surface 123a is equal to the chamfered angle $\theta_c$ and the emission angle $\theta_t$ of the light emitted from the chamfered surface 123a may be about 90 degrees or more to allow total reflection to occur.

Accordingly, based on a material forming the cover window 120, the incident angle $\theta_i$ and the chamfered angle $\theta_c$ may be determined to thereby allow the emission angle $\theta_t$ of the light emitted from the chamfered surface 123a to be about 90 degrees or more.

Further, in a case where the cover window 120 has a thickness (e.g., a predetermined thickness) Y, a width X of the edge portion 123 may be determined based on the thickness Y of the cover window 120 and the chamfered angle $\theta_c$ that may cause the total reflection. That is, the width X of the edge portion 123 may satisfy the following Formula 1.

$$X = Y/\tan(\theta_c) \qquad \text{Formula 1}$$

Likewise, in a case where the edge portion 123 has a width (e.g., a predetermined width) X, the thickness Y of the cover window 120 may be determined based on the width X of the edge portion 123 and the chamfered angle $\theta_c$ that may cause the total reflection. That is, the thickness Y of the cover window 120 may satisfy the following Formula 2.

$$Y = X^*\tan(\theta_c) \qquad \text{Formula 2}$$

Accordingly, based on at least one of the material of the cover window 120, the width X of the edge portion 123, and the thickness Y of the cover window 120, the other of the width X of the edge portion 123 and the thickness Y of the cover window 120 may be determined.

For example, in a case where the cover window 120 includes a glass material (refractive index of 1.52), the minimum value of the incident angle $\theta_i$ that may cause the total reflection is about 41.1 degrees. In other words, the total reflection may occur when the incident angle $\theta_i$ of the light incident to the chamfered surface 123a is at least about 41.1 degrees. Accordingly, the chamfered angle $\theta_c$ may be about 41.1 degrees or more.

That is, in a case where the cover window 120 includes a glass material, the edge portion 123 of the cover window 120 is chamfered at the chamfered angle $\theta_c$ of about 41.1 degrees or more. Further, when the thickness Y_glass of the cover window 120 is about 500 μm, the width X_glass of the edge portion 123 may satisfy the following Formula 3.

$$X\_glass = Y\_glass/\tan(41.1) \qquad \text{Formula 3}$$

Accordingly, in a case where the cover window 120 includes a glass material and the thickness Y_glass is about 500 μm, the width X_glass of the edge portion 123 is about 572 μm. Through the optical design described in the forgoing, the visibility of the step phenomenon of the edge area EP in the display area DA may be prevented.

According to another example embodiment, in a case where the cover window 120 includes sapphire (refractive index of 1.77), the minimum value of the incident angle $\theta_i$ that may cause the total reflection may be about 34.4 degrees. Accordingly, the chamfered angle $\theta_c$ also may be about 34.4 degrees or more.

That is, in a case where the cover window 120 includes sapphire, the edge portion 123 of the cover window 120 may be chamfered at the chamfered angle $\theta_c$ of about 34.4 degrees or more. Accordingly, when the thickness Y_sapphire of the cover window 120 is about 500 μm, the width X_sapphire of the edge portion 123 may satisfy the following Formula 4.

$$X\_sapphire = Y\_sapphire/\tan(34.4) \qquad \text{Formula 4}$$

Accordingly, in a case where the cover window 120 includes sapphire and the thickness Y_sapphire may be about 500 μm, the width X_sapphire of the edge portion 123 may be about 730 μm. Through the optical design described in the forgoing, the visibility of the step phenomenon of the edge area EP in the display area DA may be prevented or reduced.

According to still another example embodiment, in a case where the cover window 120 includes diamond (refractive index of 2.42), the minimum value of the incident angle $\theta_i$ that may cause the total reflection may be about 24.4 degrees. Accordingly, the chamfered angle $\theta_c$ also may be about 24.4 degrees or more.

That is, in a case where the cover window 120 includes diamond, the edge portion 123 of the cover window 120 may be chamfered at the chamfered angle $\theta_c$ of about 24.4 degrees or more. Further, when the thickness Y_diamond of the cover window 120 is about 500 μm, the width X_diamond of the edge portion 123 may satisfy the following Formula 5.

$$X\_diamond = Y\_diamond/\tan(24.4) \qquad \text{Formula 5}$$

Accordingly, in a case where the cover window 120 includes diamond and the thickness Y_diamond is about 500 μm, the width X_diamond of the edge portion 123 may be about 1102 μm. Through the optical design described in the forgoing, the visibility of the step phenomenon of the edge area EP in the display area DA may be prevented or reduced.

According to yet another example embodiment, in a case where the cover window 120 includes polymethylmethacrylate ("PMMA") (refractive index of 1.55), the minimum value of the incident angle $\theta_i$ that may cause the total reflection may be about 40.2 degrees. Accordingly, the chamfered angle $\theta_c$ also may be about 40.2 degrees or more.

That is, in a case where the cover window 120 includes PMMA, the edge portion 123 of the cover window 120 is chamfered at the chamfered angle $\theta_c$ of about 40.2 degrees or more. Further, when the thickness Y_PMMA of the cover window 120 is about 500 μm, the width X_PMMA of the edge portion 123 may satisfy the following Formula 6.

$$X\_PMMA = Y\_PMMA/\tan(40.2) \qquad \text{Formula 6}$$

Accordingly, in a case where the cover window 120 includes PMMA and the thickness Y_PMMA is about 500 μm, the width X_PMMA of the edge portion 123 may be about 592 μm. Through the optical design described in the forgoing, the visibility of the step phenomenon of the edge area EP in the display area DA may be prevented or reduced.

According to yet another example embodiment, in a case where the cover window 120 includes polycarbonate ("PC") (refractive index of 1.55), the minimum value of the incident angle $\theta_i$ that may cause the total reflection may be about 40.2 degrees. Accordingly, the chamfered angle $\theta_c$ also may be about 40.2 degrees or more.

That is, in a case where the cover window 120 includes PC, the edge portion 123 of the cover window 120 is chamfered at the chamfered angle $\theta_c$ of about 40.2 degrees or more. Further, when the thickness Y_PC of the cover window 120 is about 500 μm, the width X_PC of the edge portion 123 may satisfy the following Formula 7.

$$X\_PC = Y\_PC/\tan(40.2) \qquad \text{Formula 7}$$

Accordingly, in a case where the cover window 120 includes PC and the thickness Y_PC is about 500 μm, the width X_PC of the edge portion 123 may be about 592 μm. Through the optical design described in the forgoing, the visibility of the step phenomenon of the edge area EP in the display area DA may be prevented.

As set forth hereinabove, in a display device according to the example embodiments, the cover window on the display panel is optically designed, such that the step structure at the edge area of the display area having a circular shape may not be visible.

From the foregoing, it will be appreciated that various embodiments in accordance with the present disclosure have been described herein for purposes of illustration, and that various modifications may be made without departing from the scope and spirit of the present teachings. Accordingly, the various embodiments disclosed herein are not intended to be limiting of the true scope and spirit of the present invention as defined in the appended claims, and their equivalents.

What is claimed is:

1. A display device comprising:
    a display panel comprising a display area having a circular shape; and
    a cover window on the display panel,
    wherein the cover window comprises:
        a center portion covering a center area of the display area; and
        an edge portion covering an edge area of the display area,
    wherein the edge portion is chamfered and has a reduction in thickness in a direction away from the center portion,
    wherein the display area comprises a plurality of pixels arranged in a step structure at the edge area of the display area,
    wherein the edge portion of the cover window overlaps at least a part of the plurality of pixels arranged in a step structure,
    wherein incident light that is emitted from the at least a part of the plurality of pixels arranged in the step structure is incident to the chamfered edge portion of the cover window, and
    wherein the incident light is totally reflected due to a chamfered angle of the edge portion.

2. The display device of claim 1, wherein the display area comprises:
    a plurality of pixel rows arranged in a first direction; and a plurality of pixel columns arranged in a second direction intersecting the first direction, wherein the pixel rows and the pixel columns respectively comprise a plurality of pixels, and a number of the pixels decreases from a pixel row in the center area of the display area toward a pixel row at the edge area of the display area and the number of the pixels decreases from a pixel column in the center area of the display area toward a pixel column at the edge area of the display area.

3. The display device of claim 1, wherein the cover window comprises at least one of glass, sapphire, diamond, polymethylmethacrylate ("PMMA"), or polycarbonate ("PC").

4. The display device of claim 3, wherein the chamfered angle corresponding to an angle θ_glass of the edge portion is 41.1 degrees or more, when the cover window comprises glass.

5. The display device of claim 4, wherein a width X_glass of the edge portion satisfies the following Formula:

$$X\_glass = Y\_glass / \tan(\theta\_glass),$$

wherein X_glass refers to the width of the edge portion, Y_glass refers to a thickness of the cover window, and θ_glass refers to the chamfered angle of the edge portion.

6. The display device of claim 3, wherein the chamfered angle corresponding to an angle θ_sapphire of the edge portion is 34.4 degrees or more, when the cover window comprises sapphire.

7. The display device of claim 6, wherein a width X_sapphire of the edge portion satisfies the following Formula:

$$X\_sapphire = Y\_sapphire / \tan(\theta\_sapphire),$$

wherein X_sapphire refers to the width of the edge portion, Y_sapphire refers to a thickness of the cover window, and θ_sapphire refers to the chamfered angle of the edge portion.

8. The display device of claim 3, wherein the chamfered angle corresponding to an angle θ_diamond of the edge portion is 24.4 degrees or more, when the cover window comprises diamond.

9. The display device of claim 8, wherein a width X_diamond of the edge portion satisfies the following Formula:

$$X\_diamond = Y\_diamond / \tan(\theta\_diamond),$$

wherein X_diamond refers to the width of the edge portion, Y_diamond refers to a thickness of the cover window, and θ_diamond refers to the chamfered angle of the edge portion.

10. The display device of claim 3, wherein the chamfered angle corresponding to an angle θ_PMMA of the edge portion is 40.2 degrees or more, when the cover window comprises PMMA.

11. The display device of claim 10, wherein a width X_PMMA of the edge portion satisfies the following Formula:

$$X\_PMMA = Y\_PMMA / \tan(\theta\_PMMA),$$

wherein X_PMMA refers to the width of the edge portion, Y_PMMA refers to a thickness of the cover window, and θ_PMMA refers to the chamfered angle of the edge portion.

12. The display device of claim 3, wherein the chamfered angle corresponding to an angle θ_PC of the edge portion is 40.2 degrees or more, when the cover window comprises PC.

13. The display device of claim 12, wherein a width X_PC of the edge portion satisfies the following Formula:

$$X\_PC = Y\_PC / \tan(\theta\_PC),$$

wherein X_PC refers to the width of the edge portion, Y_PC refers to a thickness of the cover window, and θ_PC refers to the chamfered angle of the edge portion.

14. The display device of claim 1, wherein a cross section of the edge portion comprises a substantially flat surface extending from the center portion at an angle.

* * * * *